March 19, 1940.  C. W. MOTT  2,194,209
FLUID-OPERATED DEVICE
Filed Aug. 3, 1938
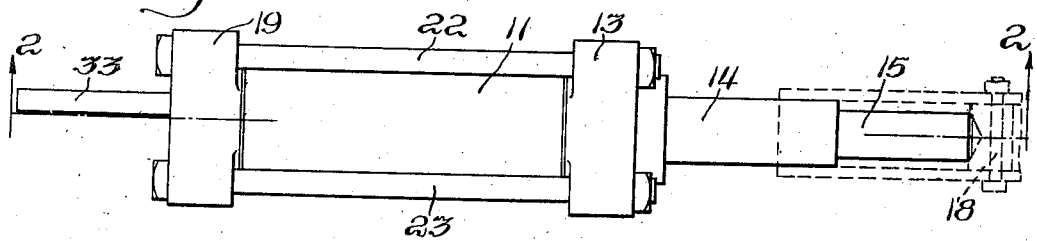
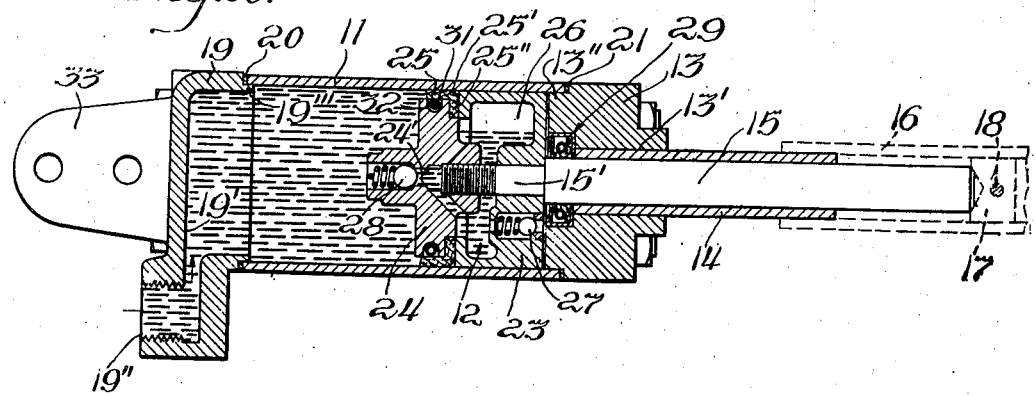
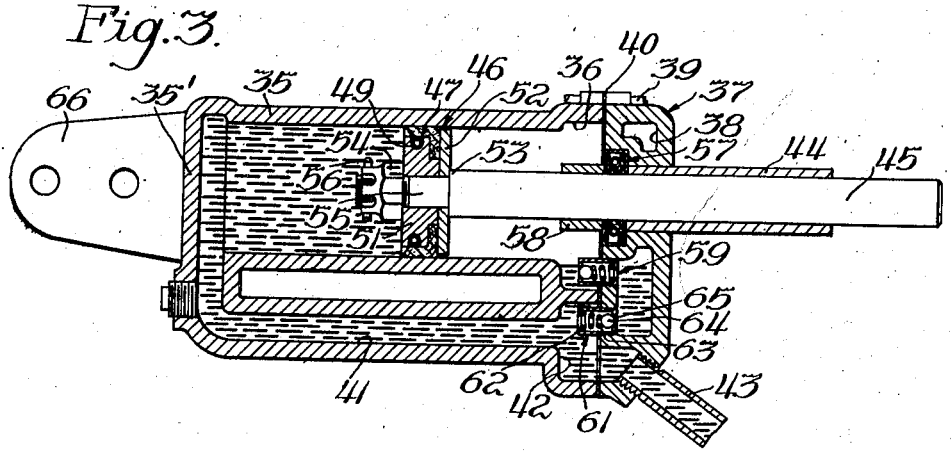
Inventor
Carl W. Mott
By V. T. Lassagne
Att'y.

Patented Mar. 19, 1940

2,194,209

UNITED STATES PATENT OFFICE 2,194,209

FLUID-OPERATED DEVICE

Carl W. Mott, Rock Falls, Ill., assignor to International Harvester Company, a corporation of New Jersey Application August 3, 1938, Serial No. 222,739

10 Claims. (Cl. 121—38)

This invention relates broadly to fluid-operated devices, and more particularly to the so-called single acting fluid devices where the working fluid is supplied to one side of the device only to perform work and then withdrawn to permit return of the workable members to their initial positions by means external of the device, such as by the object on which work has already been performed. Such single acting devices have particular application for the lifting of farm implements mounted on carrying frames from their ground-working positions and to be returned by gravity upon release of the working fluid, such as shown in the pending application of A. C. Lindgren and Carl W. Mott, Serial No. 181,778, filed December 6, 1937, where fluid is supplied under great pressure by pump means operative from a motor on the carrying frame.

In the operation of these devices, it has been found that the usual escape of fluid from the working side of the device to the non-working side is forced out of the enclosing member of the device, resulting in a loss of fluid to the fluid system, which has to be replenished. Upon continual operation of the device, this loss of fluid is quite considerable. At first glance, it might be said that a packing gland at the location of leakage through the enclosing member would solve this problem. But it should be remembered that, while adding the packing keeps the fluid from leaving the device, it does not altogether solve the problem, since the fluid is still being displaced from the working side of the device and, if allowed to collect on the non-working side, the stroke of the working member would eventually be so shortened that the device would become ineffective and no work would be obtained by the same. Also, it may further be suggested that there be better machining of the parts of the fluid device and the use of more piston rings where the piston cylinder form of the device is used, but all this adds considerably to the cost of making such a device, and even then there would only be less escape of fluid which would leak out of the enclosing member if the packing gland were not used, and which would eventually, though not so readily, stop the device as before, if the gland was used. Consequently, only a costly and relatively inefficient device of this type has been available heretofore.

It is, therefore, the main object of this invention to improve the present fluid devices and to provide a fluid operated device of the single acting type, which will be in its entirety substantially leak-proof.

It is another object of this invention to provide a fluid device of the single acting type wherein delicate machining of the relatively movable members will be unnecessary to make for efficiency in operation of the same and wherein, as a result, the cost of manufacturing the same will be small.

In general, and in the carrying out of this invention, there is provided an automatic means taking preferably the form of a compression chamber, which may be associated with the device either directly with the enclosing cylinder member or with the relatively movable piston member having communications with working and non-working sides of the enclosing member and valve means in each of these communications, whereby any fluid which has passed between the relatively movable members from the working side to the non-working side of the device during operation of the same will be forced into the compression chamber, compressing any air in the same, and from the compression chamber, upon release of the fluid pressure on the working side, be returned to the working side of the device by the air so compressed in the chamber. A valve means controls the inlet to the compression chamber and takes the form of a one-way valve permitting the fluid to flow only in a direction from the non-working or piston rod side of the device to be discharged into the compression chamber. A one-way valve means controls the outlet from the compression chamber to the working side of the device and is normally maintained closed by the working fluid and only permitted to open upon release of the working fluid and by the air pressure built up in the compression chamber on the receiving of the leakage fluid from the non-working side of the device.

For a better understanding of the invention, reference may be had to the following detailed description taken in connection with the accompanying drawing, in which:

Figure 1 is a plan view of the fluid operated device of the present invention;

Figure 2 is a cross-sectional view, in elevation, taken on the line 2—2 of Figure 1, and showing one form of the present invention in which the compression chamber is located in the piston member; and Figure 3 is a cross-sectional view, in elevation, of another form of the present invention, in which the compression chamber is associated with the enclosing member.

Referring to Figures 1 and 2, there is shown one form of the invention in which there is provided a cylinder member 11 made from ordinary stock pipe material, the bore of which does not need to be machined, as will be apparent as the description proceeds, in which there is a piston assembly 12 adapted to be relatively movable with respect thereto and a cylinder head 13 for closing the non-working end of the cylinder which carries a guide sleeve 14 within an opening 13' of the same and through which passes a piston rod 15 for slidable movement with respect thereto. This guide sleeve is used to keep that portion of the piston rod, which enters the cylinder on its return or non-working stroke, from being exposed to dust and dirt as it passes outwardly through the cylinder head 13 during its working stroke. But, also, it is for the supporting and guiding of lifting pipe 16, movement to which is imparted by engagement of the end of the piston rod 15 with an abutment in the form of a plug 17 secured therein by a bolt and nut means 18. Movement of the lifting pipe will perform work or lift implements mounted for movement on a carrying frame in the well known manner. On the opposite or working end of the cylinder is a cylinder head 19 having a chamber portion 19' for the reception of a projecting portion of the piston 12 and a passage-way 19'' for the passage of the working fluid from some pressure source. The cylinder head 19 also has a longitudinally extending flange portion 19''', on which the end of the cylinder 11 is fitted and may be sealed by a gasket 20. Likewise, the cylinder head 13 may have a similar flange portion 13'', on which the non-working end of the cylinder 11 may be fitted and sealed by a gasket 21. The entire assembly of the cylinder heads 13 and 19 and the cylinder 11 is held together by tie bolts 22 passing through holes in lugs circumferentially spaced on the cylinder heads. Thus, the cylinder 11 together with the two cylinder heads 13 and 19 form what may be termed the enclosing member for the movable piston 12. The end of the enclosing member having the cylinder head 19, through which the working fluid is received, will be regarded as the fluid working side of the device, and the opposite end of the enclosing member having the head 13, as the non-working side of the device. Since the device does work in only one direction, it may properly be termed a fluid device of the single acting type.

The piston 12 comprises in this form of the invention a recessed part 23 and a cover part 24, both of which are adapted to fit over an extending threaded portion 15' of the piston rod 15; the cover part 24 being threaded and there being provided a piston ring 25 of flexible material having a portion 25' extending longitudinally of the piston, and another portion 25'' extending radially to be fastened by tightening of the cover member 24 against the recessed member 23 on the threaded portion 15' of the piston rod, whereby there is provided within the piston a compression chamber 26.

The recessed part 23 has a one-way valve means 27 that permits the fluid, which has passed by the piston 12 and its ring 25 at any time to the non-working side of the enclosing member, to be forced into the compression chamber 26 during the working stroke of the device, thereby compressing the air within this chamber, if, in the meantime, a one-way valve means 28 in a communication 24' in the part 24 connecting the chamber with the working side of the device has been maintained in its closed position by the working fluid on the working side of the device in the moving of the piston during its working stroke. This fluid has collected on the non-working side of the device because of a packing assembly 29 carried in the opening 13' of the cylinder head about the piston rod 15, which prohibits the usual outflow of fluid with prior devices, this being the principal point of leakage for this type of device. If it were not for the present invention and with devices used heretofore, the packing assembly 29 could not be used, since there would be no means of ridding this side of the device of the leakage fluid, as this fluid would continue to collect until finally movement of the piston would be entirely prevented, making it an inoperable device. Hence, with the prior devices it was necessary to do without the packing and to sacrifice loss of fluid from the device in order to have a device which would operate.

Upon releasing the pressure of the working fluid retained in the working side of the device for the return of the piston by the weight of the implement or object which has been worked upon, the valve means 28 will open and such fluid as has been stored in the compression chamber 26 will be returned to the working side of the device or of the piston by the previously compressed air in the chamber. On the next functioning of the piston, this operation will be repeated, the fluid being taken from the non-working side of the piston and returned to the working fluid on the working side of the piston. It should now be seen that with this arrangement leakage of fluid from the device is entirely prevented without rendering the same inoperable.

In order to insure the best possible engagement of the piston ring 25 against the wall of the cylinder, there is provided a circumferentially expansible ring means 31 contained in a groove 32 in the cover member 24 and pushing radially outwardly against the longitudinally extending portion 25' of the packing ring 25.

In assembling the arrangement presently described, the piston parts and piston rod are first connected together, the cover part 24 being screwed onto the threaded piston 15' against the radially extending portion 25'' of the piston ring 25 to seal the chamber and at the same time provide efficient means for retaining a piston ring of flexible material. The piston rod is passed into the guide sleeve 14 or the cylinder head 13, and the piston is inserted in the end of the cylinder 11. The cylinder head 19 for the working end of the cylinder 11 is then connected and both of the cylinder heads are then fixed together by the tie bolts 23. With all the elements assembled, the fluid operated device now takes the form of a single unit which may be placed on an implement carrying frame or tractor, so that the guide sleeve 14 fits in the lifting pipe 16. The rear end of the unit has a vertical flange portion 33, forming a part of the cylinder head 19, for connecting the unit to the tractor at the other point rearward of the lifting pipe 16. In this arrangement just described and in the form shown in Figure 3 to be presently described, the enclosing member is that part which is anchored and the working part is the piston, but it should be understood that the piston could as well be the anchored part and the work performed by the enclosing member without departing from the spirit and scope of the present invention.

Referring now to Figure 3, there is shown another form of the invention in which the compression chamber is associated with the enclosing member rather than with the piston. In this form, there is provided a cylinder portion 35 in the form of a casting and having an integral rear end head portion 35' and an opening 36 in the forward end adapted to be closed by a cylinder head member 37 having a compression chamber 38 therein. The cylinder head 37 may be attached to the forward end of the cylinder 35 by a fastening means 39 and with a gasket 40 therebetween. In this cylinder portion there is provided a passage-way means 41 for the communication of working fluid from the opened end of the same to the rear end or working side of the device. This passage-way has an opening 42 where fluid from a pressure source is received to be communicated to the rear end or working side of the device. This fluid is received from a pump source by means of a pipe 43 connected to the cylinder head or cover 37 in alinement with the opening 42 of the cylinder portion. The cylinder 35, taken with the cylinder head 37, forms an enclosing member.

The cylinder head 37 has a guide sleeve 44 for serving the same purpose as the guide sleeve 15 of Figure 2, through which passes the piston rod 45 having a piston designated generally at 46. The piston 46 has a piston ring 47 of flexible material having a longitudinally extending portion and a radially extending portion, the longitudinal portion of which is held against the cylinder wall by a circumferentially expansible ring fitted in a groove 49 of an element 51, and the ring is there retained by tightening the element 51 against the radial portion and against a plate 52 bearing against a shoulder portion 53 on the piston rod 45 by means of a clamping nut 54 tightened on a rearwardly extending portion 55 of the piston rod 45. The clamping nut 54 is retained in its tightened position by a cotter pin 56.

Likewise, with this form of the invention, certain leakage passes from the rear of the cylinder or working side of the device to the forward end of the cylinder or non-working side of the device, and this leakage fluid will tend to accumulate in the forward end of the cylinder, there being a packing gland assembly 57 carried by the closure or cylinder head 37 and surrounding the piston rod 45 to prevent leakage from the device. As a stop for the forward movement of the piston, there is provided a loose ring 58 surrounding the piston rod and adapted to abut the packing gland. The devices, by the use of the packing glands, are substantially hermetically sealed.

An inlet one-way valve means 59 permits the accumulated fluid to pass into the compression chamber 38 during the working stroke of the piston, and, because of the fact that fluid pressure is already present in the opening 42 and bearing against a one-way outlet valve means 61 for the compression chamber 38 to maintain the same closed, the air within the compression chamber will be compressed, so that, upon relieving the piston 46 of the fluid pressure, such fluid which has been collected in the compression chamber will be returned through the valve means 61 to the passage-way opening 42 and be commingled again with the working fluid. Thus, there has been provided another form of the invention whereby accumulated fluid can be revention moved from the non-working side of the device and returned to the working fluid on the working side of the device.

Preferably, the valve members 59 and 61 take the form of an assembled fitting comprising a casing 62 with the ends thereof turned inwardly, one end being turned in after inserting a biasing spring 63 and a ball valve 64, which bears against a valve seat 65. The casing 62 is threaded for attachment to the cover member 37, in which there is an opening for communication with the compression chamber 38 thereof. These valve casings are easily attached to the cover member and are assembled as a part thereof.

Likewise, this form may have a vertical portion, as indicated at 66, for anchoring the device to the implement carrying frame, though it should be understood that this portion could be used for attaching the device to the implement and the piston could be anchored to the carrying frame.

While the two forms of invention show the compression chamber as a part of the piston member or as a part of the enclosing member, it should be understood, however, that this compression chamber might be separate from the enclosing member and only associated therewith by communications with both sides of the device. Also, it might take some other form, but it is intended that the present invention resides in any form wherein a compression chamber is utilized for automatically collecting leakage fluid from the non-working side of the device and returning it to the working side of the same. In other words, the leakage fluid, which may have escaped between the piston or enclosed member and the enclosing member and collected in one location of the enclosing member, is automatically removed from that location during the operation of the device. Further, while the forms here described have reference specifically to a piston cylinder type, it should be understood that the invention herein may be applied to any fluid device, regardless of the form thereof.

It should now be seen that, since means is utilized for the collecting of leakage fluid, any necessity for machining of the piston and cylinder parts to any fineness is eliminated, and thus the cost of making a fluid-operated device has been appreciably reduced. With the present form of the device, greater leakage by the piston may take place and any possible leakage from the cylinder is practically eliminated. Hence, there has been provided by the present invention a substantially leak-proof cylinder or fluid device.

While various changes in the details of the construction may be apparent, it is intended that these changes shall be within the spirit and scope of the invention as defined by the appended claims.

What is claimed is:

1. In a fluid-operated device, two members movable relative to each other, one of which serves to enclose the other, one of the members having a compression chamber, valve means to permit the flow of leakage fluid into the compression chamber as one of the members moves relative to the other in one direction whereby any air therein will be compressed, and another valve means to return the fluid taken into the compression chamber to the working side of the device adapted to open under the action of the compressed air built up in the compression chamber.

2. In a fluid-operated device, two members movable relative to each other, one of which serves to enclose the other and one of the members having a compression chamber, a one-way valve to permit the flow of leakage fluid into the compression chamber as one of the members moves in one direction whereby any air normally therein will be compressed, and another one-way valve to permit the flow of fluid out of the compression chamber upon release of fluid pressure upon the movable member adapted to open under the action of the compressed air built up in the compression chamber.

3. In a fluid-operated device, two members movable relative to each other, one of which serves to enclose the other, a compression chamber means having inlet and outlet communications with the enclosing member, valve means in the inlet communication to permit the flow of leakage fluid to the compression chamber means upon movement of the movable member in one direction, and another valve means in the outlet communication to permit the return of the fluid collected in the compression chamber to the enclosing member upon release of fluid pressure on the movable member.

4. In a fluid-operated device, a cylinder member, a piston member movable within the cylinder member, compression chamber means associated with the cylinder member and adapted to have fluid communication with both ends of the cylinder member at both sides of the piston member, a one-way means for permitting the flow of leakage fluid from one end of the cylinder member to the chamber means on movement of the piston in one direction, and a one-way valve means for permitting the flow of the fluid from the chamber means to the other end of the cylinder on release of fluid pressure on the piston.

5. In a fluid-operated device, a cylinder means having a passage means for the communication of fluid to and from one end of the cylinder opening thereof and extending lengthwise to the other end of the cylinder means, a piston movable within the cylinder, a cylinder head member for the other end of the cylinder means having a compression chamber adapted to have fluid communication with the end of the cylinder means and with the other end of the cylinder means through the passage means, valve means to permit flow of leakage fluid into the compression chamber on movement of the piston toward the same, and valve means for permitting flow of the fluid in the compression chamber to join with the fluid in the passage means of the cylinder means.

6. In a fluid-operated device, a cylinder means having a passage means for the communication of fluid to and from one end of the cylinder opening in one end thereof and extending lengthwise to the other end of the cylinder means, a piston movable within the cylinder means, a closure head for the other end of the cylinder means having a compression chamber adapted for fluid communication with the end of the cylinder means and with the passage means to the other end of the cylinder, a one-way valve carried by the closure to permit flow of leakage fluid into the chamber upon movement of the piston toward the same, and another one-way valve carried by the closure member for permitting discharge of the fluid received in the compression chamber for communication to the passage means and to the other end of the cylinder means whereby both of the valve means are removable with the closure member.

7. In a fluid-operated device, a cylinder and a piston movable therein, said piston having a compression chamber and communications therewith from each end of the cylinder, valve means to permit the flow of leakage fluid from one end of the cylinder into the compression chamber during one movement of the piston, and valve means in the communications with the other end of the cylinder for permitting the return of fluid from the chamber to the other end of the cylinder.

8. In a fluid-operated device, a cylinder and a piston movable therein, said piston having a compression chamber and formed of a separable recessed part and a cover part, each of which parts has a valve-controlled passage means, one of the passage means serving to permit inflow of leakage fluid from one end of the cylinder and the other passage means serving to permit outflow of fluid from the compression chamber and to the other end of the cylinder, and means for fixing the cover part to the recessed part.

9. In a fluid-operated device, a cylinder and a piston movable therein, said piston having a compression chamber and being formed of a recessed part and a separable cover part, each of which parts has a valve-controlled passage means, one of the passage means serving to permit inflow of leakage fluid from one end of the cylinder and the other passage means serving to permit outflow of fluid from the compression chamber and to the other end of the cylinder, a piston ring of flexible material adapted to be disposed between the two parts, and means for fixing the cover part and piston ring to the recessed part.

10. In a fluid-operated device, a cylinder and a piston movable therein, said piston having a compression chamber and being formed of a separable recessed part and a cover part, each of which parts has a valve-controlled passage means, one of the passage means serving to permit inflow of leakage fluid from one end of the cylinder and the other passage means serving to permit outflow of fluid from the compression chamber and to the other end of the cylinder, a piston ring of flexible material adapted to be disposed between the two parts and having a longitudinally extending portion overlapping the cover part, said cover part having a circumferential groove, a circumferentially expanding ring adapted to fit in said groove and to bear against the longitudinal portion of the piston ring to retain the same against the cylinder, and means for fixing the cover part and piston ring to the recessed part.

CARL W. MOTT.